US009330663B2

(12) United States Patent
Sharifi

(10) Patent No.: US 9,330,663 B2
(45) Date of Patent: *May 3, 2016

(54) INITIATING ACTIONS BASED ON PARTIAL HOTWORDS

(71) Applicant: Google Inc., Mountain View, CA (US)

(72) Inventor: Matthew Sharifi, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/220,781

(22) Filed: Mar. 20, 2014

(65) Prior Publication Data
US 2015/0154954 A1   Jun. 4, 2015

Related U.S. Application Data

(63) Continuation of application No. 14/096,359, filed on Dec. 4, 2013, now Pat. No. 8,768,712.

(51) Int. Cl.
G10L 15/08   (2006.01)
G10L 15/22   (2006.01)
G10L 15/28   (2013.01)

(52) U.S. Cl.
CPC .............. G10L 15/08 (2013.01); G10L 15/22 (2013.01); G10L 15/28 (2013.01); G10L 2015/088 (2013.01); G10L 2015/223 (2013.01)

(58) Field of Classification Search
CPC ... G10L 15/20; G10L 15/22; G10L 2015/223; G10L 15/28; G10L 15/285
See application file for complete search history.

(56) References Cited

U.S. PATENT DOCUMENTS

| 5,127,055 | A | * | 6/1992 | Larkey | 704/244 |
| 5,577,164 | A | * | 11/1996 | Kaneko et al. | 704/275 |
| 5,621,859 | A | | 4/1997 | Schwartz | |
| 5,679,001 | A | | 10/1997 | Russell | |
| 5,740,318 | A | * | 4/1998 | Naito et al. | 704/253 |
| 5,799,273 | A | * | 8/1998 | Mitchell et al. | 704/235 |
| 5,864,805 | A | * | 1/1999 | Chen et al. | 704/235 |
| 5,905,971 | A | * | 5/1999 | Hovell | 704/257 |
| 5,995,930 | A | | 11/1999 | Hab | |
| 6,307,548 | B1 | | 10/2001 | Flinchem | |
| 6,535,849 | B1 | * | 3/2003 | Pakhomov et al. | 704/235 |

(Continued)

FOREIGN PATENT DOCUMENTS

| EP | 2 337 024 | 6/2011 |
| EP | 2 610 862 | 7/2013 |

(Continued)

OTHER PUBLICATIONS

International Search Report and Written Opinion in International Application No. PCT/US2014/031475, mailed Aug. 26, 2014, 12 pages.

Primary Examiner — Eric Yen
(74) Attorney, Agent, or Firm — Fish & Richardson P.C.

(57) ABSTRACT

Methods, systems, and apparatus, including computer programs encoded on a computer storage medium, receiving audio data; determining that an initial portion of the audio data corresponds to an initial portion of a hotword; in response to determining that the initial portion of the audio data corresponds to the initial portion of the hotword, selecting, from among a set of one or more actions that are performed when the entire hotword is detected, a subset of the one or more actions; and causing one or more actions of the subset to be performed.

20 Claims, 9 Drawing Sheets

(56) References Cited

U.S. PATENT DOCUMENTS

| | | |
|---|---|---|
| 7,809,553 B2 | 10/2010 | Fux |
| 7,826,945 B2 | 11/2010 | Zhang |
| 8,224,650 B2 | 7/2012 | Galanes |
| 8,554,560 B2 | 10/2013 | Valsan |
| 2002/0013701 A1 | 1/2002 | Oliver |
| 2002/0031086 A1 | 3/2002 | Welin |
| 2002/0046032 A1 | 4/2002 | Wutte |
| 2002/0128827 A1 | 9/2002 | Bu |
| 2003/0033146 A1* | 2/2003 | Morin et al. ............... 704/251 |
| 2003/0220798 A1 | 11/2003 | Schmid |
| 2004/0220809 A1 | 11/2004 | Wang |
| 2005/0159950 A1 | 7/2005 | Roth |
| 2007/0100635 A1 | 5/2007 | Mahajan |
| 2007/0135187 A1 | 6/2007 | Kreiner |
| 2007/0150288 A1 | 6/2007 | Wang |
| 2007/0288129 A1 | 12/2007 | Komer |
| 2007/0288241 A1* | 12/2007 | Cross et al. ............... 704/270.1 |
| 2008/0049908 A1* | 2/2008 | Doulton .................... 379/88.14 |
| 2008/0059186 A1 | 3/2008 | Mowatt |
| 2008/0120102 A1* | 5/2008 | Rao .............................. 704/235 |
| 2009/0204409 A1 | 8/2009 | Mozer |
| 2009/0299741 A1 | 12/2009 | Chittar |
| 2011/0102161 A1 | 5/2011 | Heubel |
| 2011/0313768 A1 | 12/2011 | Klein |
| 2012/0271633 A1 | 10/2012 | Yoshida |
| 2013/0173270 A1* | 7/2013 | Han et al. ..................... 704/275 |
| 2013/0325485 A1 | 12/2013 | Chittar |
| 2014/0297287 A1* | 10/2014 | Newman ..................... 704/275 |

FOREIGN PATENT DOCUMENTS

| | | |
|---|---|---|
| WO | 00/58942 | 10/2000 |
| WO | 2012/025784 | 3/2012 |
| WO | 2013/163113 | 10/2013 |

* cited by examiner

INITIATING ACTIONS BASED ON PARTIAL HOTWORDS

CROSS-REFERENCE TO RELATED APPLICATIONS

This application is a continuation of U.S. patent application Ser. No. 14/096,359, entitled "Initiating Actions Based On Partial Hotwords," filed Dec. 4, 2013, which is incorporated herein by reference in its entirety.

FIELD

The present disclosure discusses initiating actions based on partial hotwords, and, more specifically, providing an initial action in response to detecting the partial hotword.

BACKGROUND

Vocal utterances may include a hotword, i.e., a predetermined reserved word that causes a system to perform a corresponding action or actions. A speech recognition service on an electronic device generally receives the vocal utterances that include spoken words from a user, and transcribes the spoken words into text. To accomplish this, the speech recognition service may attempt to match the sounds of the spoken input with phonetic representations of textual words.

SUMMARY

According to some innovative aspects of the subject matter described in this specification, the detection of an initial portion of a hotword causes an action to be performed. A user may say a hotword such as "OK Google" to a mobile computing device that causes actions to be performed by the mobile computing device. For example, the hotword "OK Google" causes the mobile computing device to wake from a sleep or stand-by state.

Upon detection of an initial portion of the hotword, e.g., the "OK" portion of the hotword "OK Google," the mobile computing device can cause certain actions to be performed that are associated with the full hotword "OK Google." For instance, upon detection of the partial hotword "OK," the mobile computing device can open a network connection. By causing a subset of the actions that are associated with the hotword to be performed after detecting an initial portion of the hotword can reduce latency associated with the hotword, and thus, the processing time associated with the hotword is reduced, while being transparent to the user. That is, the user perceives a speed improvement of the mobile computing device.

Innovative aspects of the subject matter described in this specification may be embodied in methods that include the actions of receiving audio data; determining that an initial portion of the audio data corresponds to an initial portion of a hotword; in response to determining that the initial portion of the audio data corresponds to the initial portion of the hotword, selecting, from among a set of one or more actions that are performed when the entire hotword is detected, a subset of the one or more actions; and causing one or more actions of the subset to be performed Other embodiments of these aspects include corresponding systems, apparatus, and computer programs, configured to perform the actions of the methods, encoded on computer storage devices.

These and other embodiments may each optionally include one or more of the following features. For instance, identifying one or more acoustic features of the initial portion of the audio data; comparing the one or more acoustic features of the initial portion of the audio data to one or more acoustic features associated with one or more hotwords stored in a database; and based on the comparing, determining that the initial portion of the audio data corresponds to the initial portion of the hotword of the one or more hotwords stored in the database. Obtaining a transcription of the initial portion of the audio data, the audio data including a speech utterance; comparing the transcription of the initial portion of the audio to one or more transcriptions associated with one or more hotwords stored in a database; and based on the comparing, determining that the initial portion of the audio corresponding to the initial portion of the hotword of the one or more hotwords stored in the database. The initial portion of the hotword includes less than the entire hotword. Tthe one or more actions of the subset include actions that are not visible to a user of a computing device performing the actions. The one or more actions of the subset of includes actions that are performed in a background computing environment of a computing device performing the actions. Transmitting an interrupt signal to an operating system executing on a computing device to perform the one or more actions. The interrupt signal causes the operating system to initialize a camera functionality of the computing device. The interrupt signal causes the operating system to activate the computing device from a sleep state. The interrupt signal causes the operating system to initialize a network connection on the computer device. The interrupt signal causes the operating system to preload an application on the computing device associated with the hotword.

The features further include, for example, receiving a subsequent portion of the audio data; determining that the initial portion of the audio data and the subsequent portion of the audio data, collectively correspond to the entire hotword; in response to determining that the initial portion of the audio data and the subsequent portion of the audio data, collectively, correspond to the entire hotword, selecting, from among the set of one or more actions that are performed when the entire hotword is detected, an additional subset of the one or more actions; and causing the one or more actions of the additional subset to be performed. The set of the one or more actions includes the subset of the one or more actions and the additional subset of the one more actions. Receiving a subsequent portion of the audio data; determining that the initial portion of the audio data and the subsequent portion of the audio data, collectively, do not correspond to the entire hotword; and in response to determining that the initial portion of the audio data and the subsequent portion of the audio data, collectively, do not correspond to the entire hotword, causing the one or more actions of the subset to be reversed. Selecting an additional subset of one or more actions that when performed, reverse the one or more actions of the subset of the one or more actions; and causing the one or more actions of the addition subset to be performed. Prior to receiving the audio data, receiving (i) data indicating the initial portion of the audio data corresponds to the initial portion of the hotword and (ii) data indicating the subset of the actions associated with the hotword. The hotword is a particular term that triggers semantic interpretation of an additional term of one or more terms that follow the particular term.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
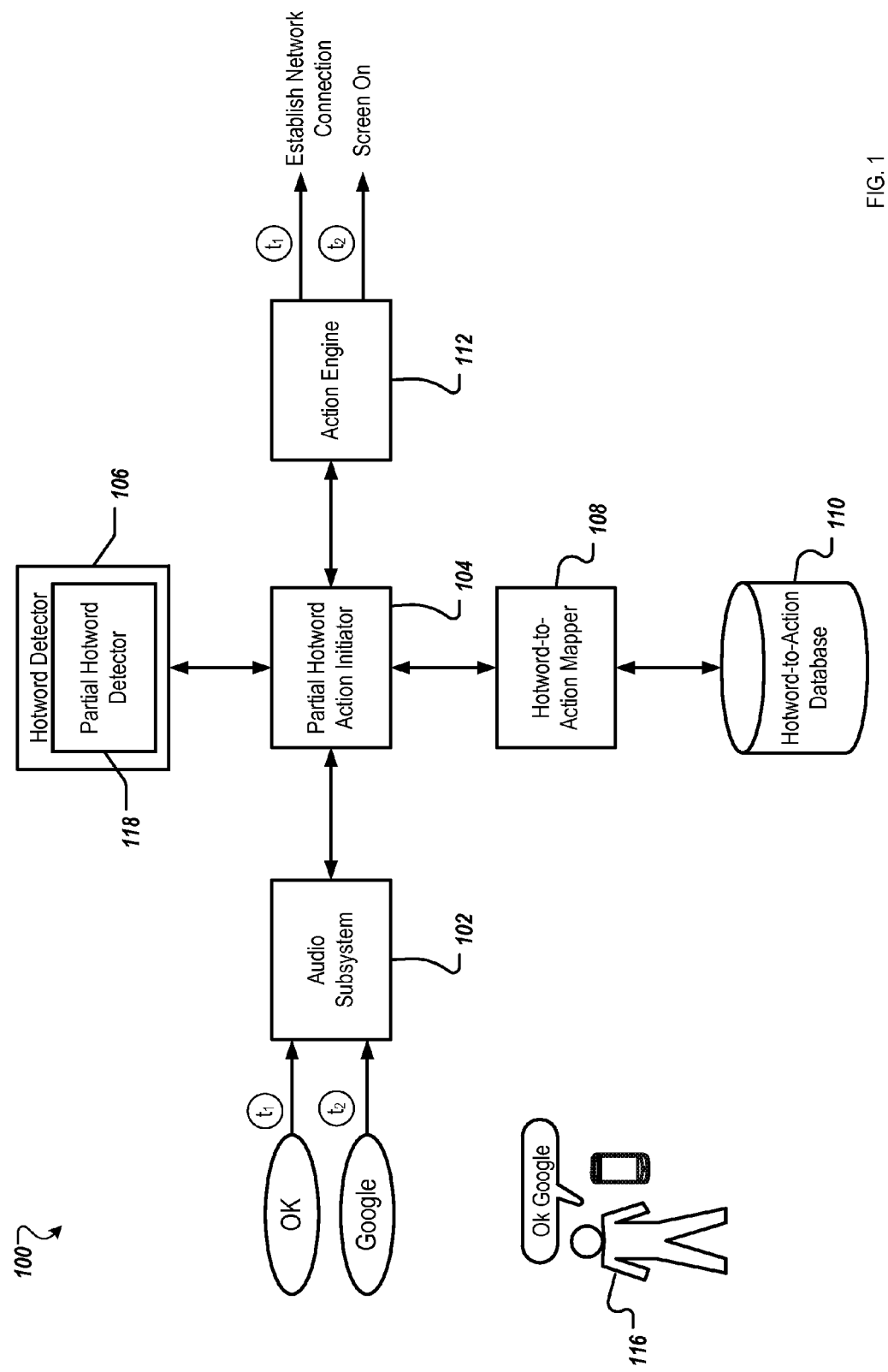
FIG. 1 depicts an example system for detecting partial hotwords.

FIG. 1 depicts a system 100 for detecting partial hotwords. In some examples, the system 100 includes an audio subsystem 102, a partial hotword action initiator 104, a hotword detector 106, a hotword-to-action mapper 108, a hotword-to-action database 110, and an action engine 112. In some examples, the system 100 is a mobile computing device, e.g., a mobile computing device 100. In some examples, the mobile computing device includes a smartphone, or tablet-computing device. The mobile computing device 100 can include any audio detection means, e.g., a microphone, for detecting utterances from a user 116.

In some examples, the user 116 says one or more words that the mobile computing device 100 detects. In some examples, the utterance includes one or more hotwords, or partial hotwords, that cause an action to be performed by the mobile computing device 100. As depicted in the illustrated example, the user 116 says "OK Google." The mobile computing device 100 detects the utterance "OK Google" with the audio subsystem 102 appropriately receiving audio data of the utterance "OK Google."

In the illustrated example, the audio subsystem 102 receives the initial portion of the audio data associated with the utterance "OK" at a time $t_1$. The initial portion of the audio data can include a first few audio frames of the utterance, or a first few hundred milliseconds of audio data associated with the utterance. In some examples, the audio subsystem 102 processes the utterance to generate waveform data that includes a portion of the utterance, or substantially a whole portion of the utterance.

In some examples, the audio subsystem 102 appropriately processes the received audio data. For example, the audio subsystem 102 identifies one or more acoustic features of the initial portion of the audio data. In the illustrated example, the audio subsystem 102 identifies acoustic features associated with the initial portion of the audio data associated with the utterance "OK." In some examples, the audio subsystem 102 obtains a transcription of the initial portion of the audio data associated with the utterance "OK." In the illustrated example, the audio subsystem 102 obtains a transcription of the initial portion of the audio data associated with the utterance "OK."

In some examples, the audio subsystem 102 provides the processed audio data to the partial hotword action initiator 104. For example, the audio subsystem 102 provides the processed audio data associated with the utterance "OK" to the partial hotword action initiator 104. In some examples, the processed audio data can include acoustic features associated with the utterance "OK," a transcription associated with the utterance "OK," or both.

The partial hotword action initiator 104 receives the processed audio data from the audio subsystem 102. For example, the processed audio data can include audio data associated with the utterance "OK," acoustic features associated with the utterance "OK," a transcription associated with the utterance "OK," or any combination thereof. The partial hotword action initiator 104 provides the processed audio data to the hotword detector 106.

The hotword detector 106 receives the processed audio data from the partial hotword action initiator 104. In the illustrated example, the hotword detector 106 initially receives the processed audio data associated with the utterance "OK," e.g., an initial portion of the audio data. The hotword detector 106 determines that the received audio data corresponds to an initial portion of a hotword. Specifically, the hotword detector 106 includes a partial hotword detector 118. The partial hotword detector 118 determines that the initial portion of the audio data corresponds to an initial portion of a hotword. In the illustrated example, the partial hotword detector 118 determines that the initial portion of the audio data associated with the utterance "OK" corresponds to an initial portion of a hotword "OK Google." In some examples, the initial portion of a hotword includes less than the entire hotword. For example, the initial portion "OK" is less than the entire hotword "OK Google."

In some examples, the received audio data includes associated acoustic features, e.g., as identified by the audio subsystem 102. The partial hotword detector 118 compares the acoustic features of the initial portion of the audio data associated with the utterance "OK" to acoustic features associated with one or more hotwords stored in a database. Specifically, each hotword is associated with one or more acoustic features, e.g., phonetics of the hotword. A database, or table, stores a mapping between the hotwords and an associated acoustic feature(s). In some examples, a hotword, is associated with two or more acoustic features. In some examples, an acoustic feature is associated with two or more hotwords.

Based on the comparing of acoustic features, the initial portion of the audio data associated with the utterance "OK" is determined to correspond to an initial portion of a hotword stored in the database. For example, it is determined that the acoustic features of the initial portion of the audio data associated with the utterance "OK" corresponds to an initial portion of a hotword "OK Google" based on the comparison of the acoustic features of the utterance "OK" and the acoustic features of the hotword "OK Google."

In some examples, the processed audio data includes a transcription, e.g., as obtained by the audio subsystem 102. The partial hotword detector 118 compares the transcription of the initial portion of the audio data associated with the utterance "OK," to transcriptions associated with hotwords stored in a database. Specifically, a hotword is associated with a transcription. A database, or table, stores a mapping between the hotword and a transcription.

Based on the comparing of transcriptions, the transcription of the initial portion of the audio data associated with the partial utterance "OK" is determined to correspond to an initial portion of a hotword stored in a database. For example, it is determined that the transcription of the initial portion of the audio data associated with the utterance "OK" corresponds to an initial portion of a hotword "OK Google" based on the comparison of the transcription of the utterance "OK" and the transcription of the hotword "OK Google."

The hotword detector 106 provides a result of the determination that the initial portion of the audio data corresponds to the initial portion of a hotword to the partial hotword action initiator 104. Specifically, in the illustrated example, the hotword detector 106 provides the partial hotword "OK," or a signal associated with the partial hotword "OK," to the partial hotword action initiator 104.

The partial hotword action initiator 104 receives the result of the determination from the hotword detector 106. Specifically, in the illustrated example, the partial hotword action initiator 104 receives the partial hotword "OK," or a signal associated with the partial hotword "OK," from the hotword detector 106. The signal can include an indication that the initial portion of the audio data associated with the utterance "OK" corresponds to an initial portion of a hotword. In response, the partial hotword action initiator 104 provides the partial hotword "OK," or the signal associated with the partial hotword "OK," to the hotword-to-action mapper 108.

The hotword-to-action mapper 108 receives the result of the determination that the initial portion of the audio data corresponds to the initial portion of the hotword from the partial hotword action initiator 104. Specifically, in the illustrated example, the hotword-to-action mapper 108 receives the partial hotword "OK," or the signal associated with the partial hotword "OK," from the partial hotword action initiator 104. The hotword-to-action mapper 108 selects, from among a set of actions that are performed when the entire hotword is detected, a subset of the actions. Specifically, each hotword is associated with one or more actions, e.g., actions that are performed when the entire hotword is detected. A hotword-to-action database 110 stores mapping between hotwords and associated actions. In some examples, a hotword is mapped to two or more actions. In some examples, an action is mapped to two or more hotwords.

In the illustrated example, upon detection of the partial hotword "OK," the hotword-to-action mapper 108 identifies a particular set of actions that are associated with the entire hotword "OK Google." That is, the hotword-to-action mapper 108 is in communication with the hotword-to-action database 110 to identify a mapping between the entire hotword "OK Google" and the particular set of actions from multiple sets of actions that are associated with the entire hotword "OK Google." The hotword-to-action mapper 108 selects a subset of actions from among the particular set of actions associated with the entire hotword "OK Google." Specifically, the hotword-to-action mapper 108 selects the subset of actions that are further associated with the partial hotword "OK" of the entire hotword "OK Google." In some examples, the hotword-to-action mapper 108 identifies the subset of actions that are associated with the partial hotword "OK."

In some examples, the hotword-to-action mapper 108 can use multiple criteria for selecting the subset of actions. For example, the hotword-to-action mapper 108 can select actions from the particular set of actions that are not visible to the user. That is, select actions that are not visible to the user that include actions caused to be performed by the mobile computing device 116 that are not readily noticeable or detectable by the user 116, e.g., visually or audible detectable by the user 116. For example, the actions can include actions that are not shown on a user interface of the mobile computing device 100, or actions that do not make noise by the mobile computing device 100. In some examples, the selected actions can include actions that are performed in a background computing environment of the mobile computing device 100. In the illustrated example, the subset of actions include an action of establishing a network connection, e.g., with a third-party computing server or a back-end computing server. In some examples, the selected actions can include actions that have no lasting or permanent effects, i.e., are reversible, on the mobile computing device The hotword-to-action mapper 108 provides data identifying the subset of actions to the partial hotword action interior 104. Specifically, the hotword-to-action mapper 108 provides data identifying the subset of actions associated with the hotword "OK Google" to the partial hotword action initiator 104.

The partial hotword action initiator 104 receives the data identifying the subset of actions from the hotword-to-action mapper 108, and in response, provides the data identifying the subset of actions to the action engine 112. Specifically, by providing the data identifying the subset of actions to the action engine 112, the partial hotword action initiator 104 causes the subset of actions to be performed.

The action engine 112 receives the data identifying the subset of actions from the partial hotword action initiator 104. In the illustrated example, the action engine 112 receives the data identifying the subset of actions associated with the initial portion of the hotword "OK Google," as selected by the hotword-to-action mapper 108.

Specifically, the subset of actions that are associated with the partial hotword "OK" of the entire hotword "OK Google" are performed at the time $t_1$. The action engine 112 causes an action of establishing a network connection to be performed, e.g., by the operating system executing on the mobile computing device 100.

In some examples, causing the subset of actions to be performed includes transmitting an interrupt signal to the operating system executing on the mobile computing device 100. In some examples, the interrupt signal causes the operating system to initialize a camera functionality of the mobile computing device 100. In some examples, the interrupt signal causes the operating stem to activate the mobile computing device 100 from a sleep state. That is, that state of the mobile computing device 100 is changed from a sleep state, or an "off" state, to a wake state, or an "on" state. In some examples, the interrupt signal causes the operating system to preload an application stored on the mobile computing device 100 that is associated with the hotword. That is, the application can be preloaded into a memory of the mobile computing device 100.

In some further implementations, after receiving the initial portion of the audio data, the audio subsystem 102 receives a subsequent portion of the audio data. For example, the audio subsystem 102 receives the subsequent portion of the detected utterance, e.g., subsequent to the initial portion of the audio data. In the illustrated example, the audio subsystem 102 receives the subsequent portion of the audio data associated with the utterance "Google" at a time $t_2$. The audio subsystem 102 appropriately processes the received audio data. In some examples, the audio subsystem 102 receives a whole portion of the audio, including the initial portion and the subsequent portion.

In some examples, the hotword is a particular term that triggers semantic interpretation of an additional term of one or more terms that follow the particular term. For example, by the initial portion of the audio data associated with the utterance "OK" corresponding to an initial portion of a hotword, the audio subsystem 102 provides a semantic interpretation of the subsequent portion of the audio data associated with the utterance "Google."

In some examples, the audio subsystem 102 provides the processed audio data associated with the entire utterance to the partial hotword action initiator 104. For example, the audio subsystem 102 provides the processed audio data associated with the utterance "OK Google" to the partial hotword action initiator 104. In some examples, the processed audio data can include acoustic features associated with the utterance "OK Google," a transcription associated with the utterance "OK Google," or both.

The partial hotword action initiator 104 receives the processed audio data from the audio subsystem 102. For example, the processed audio data can include the audio data associated with the utterance "OK Google," acoustic features associated with the audio data associated with the utterance "OK Google," a transcription associated with the audio data associated with the utterance "OK Google," or any combination thereof. The partial hotword action initiator 104 provides the processed audio data to the hotword detector 106.

The hotword detector 106 receives the processed audio data from the partial hotword action initiator 104. In the illustrated example, the hotword detector 106 receives the processed audio data associated with the initial portion of the audio associated with the utterance "OK" and the subsequent portion of the audio data associated with the utterance "Google." In other words, the hotword detector 106 receives the audio data associated with the entire utterance "OK Google." In the illustrated example, the hotword detector 106 determines that the initial and the subsequent portion of the audio data, collectively, correspond to the entire hotword "OK Google."

The hotword detector 106 provides a result of the determination that the initial portion and the subsequent portion of the audio data associated with the utterance "OK Google" collectively correspond to the entire hotword to the partial hotword action initiator 104. Specifically, in the illustrated example, the hotword detector 106 provides the entire hotword "OK Google," or a signal associated with the entire hotword "OK Google," to the partial hotword action initiator 104. The signal can include an indication that the initial portion and the subsequent portion of the audio data, collectively, correspond to an entire hotword.

The partial hotword action initiator 104 receives the result of the determination from the hotword detector 106. Specifically, in the illustrated example, the partial hotword action initiator 104 receives the entire hotword "OK Google," or a signal associated with the entire hotword "OK Google," from the hotword detector 106. In response, the partial hotword action initiator 104 provides the entire hotword "OK Google," or a signal associated with the entire hotword "OK Google," to the hotword-to-action mapper 108.

The hotword-to-action mapper 108 receives the result, e.g., a signal, of the determination that the initial portion and the subsequent portion of the audio data associated with the utterance "OK Google" collectively correspond to the entire hotword from the partial hotword action initiator 104. Specifically, in the illustrated example, the hotword-to-action mapper 108 receives the entire hotword "OK Google," or a signal associated with the entire hotword "OK Google," from the partial hotword action initiator 104. The hotword-to-action mapper 108 selects, from among a set of actions that are performed when the entire hotword is detected, an additional subset of the actions.

In the illustrated example, upon receipt of the entire hotword "OK Google," or the signal associated with the entire hotword "OK Google," the hotword-to-action mapper 108 identifies a particular set of actions that are associated with the entire hotword "OK Google." That is, the hotword-to-action mapper 108 is in communication with the hotword-to-action database 110 to identify a mapping between the entire hotword "OK Google" and the particular set of actions from multiple sets of actions. The hotword-to-action mapper 108 selects an additional subset of actions from among the particular set of actions associated with the entire hotword "OK Google." In some examples, the set of actions associated with the entire hotword "OK Google" includes the subset of actions and the additional subset of actions. In some examples, the additional subset of actions includes the subset of actions. In some examples, the additional subset of actions includes one or more actions of the subset of actions. For example, upon detection of the entire hotword "OK Google," each action of the subset of actions may have not been fully performed by the action engine 112. Thus, any unperformed actions associated with the subset of actions can further be included by the additional subset of actions.

The hotword-to-action mapper 108 provides data identifying the additional subset of actions to the partial hotword action initiator 104. That is, the hotword-to-action mapper 108 provides data identifying the additional subset of actions associated with the detection of the entire hotword "OK Google" to the partial hotword action initiator 104.

The partial hotword action initiator 104 receives the data identifying the additional subset of actions from the hotword-to-action mapper 108, and in response, provides the data identifying the additional subset of actions to the action engine 112. Specifically, by providing the data identifying the additional subset of actions to the action engine 112, the partial hotword action initiator 104 causes the additional subset of actions to be performed.

The action engine 112 receives the data identifying the additional subset of actions from the partial hotword action initiator 104. In the illustrated example, the action engine 112 receives the data identifying the additional subset of actions associated with the detection of the entire hotword, as selected by the hotword-to-action mapper 108. Specifically, the additional subset of actions that are associated with the entire hotword "OK Google" are performed at the time $t_2$. In response to receiving the additional subset of actions, the action engine 112 causes an action of turning a display, or screen, of the mobile computing device 100 to be in an "on" state. In some examples, in response to receiving the additional subset of actions, the action engine 112 causes an action of displaying a user interface. In some examples, the set of actions associated with the detection of the partial hotword "OK" and the additional set of actions associated with the detection of the entire hotword "OK Google" are caused to be performed by the action engine 112 in parallel, or at substantially the same time.

In some further implementations, before receiving the audio data, additional data is received (i) indicating that the initial portion of the audio data corresponds to the initial portion of the hotword and additional data (ii) indicating the subset of the actions associated with the hotword. For example, prior to receiving the audio data "OK Google" from the user 116, the mobile computing device 100 is "trained," e.g., receives the additional data, such that the partial hotword detector 118 is able to determine whether an initial portion of the audio data, e.g., the "OK" utterance, corresponds to an initial portion of a hotword, e.g., "OK Google." Additionally, for example, the mobile computing device 100 receives the additional data such that the hotword-to-action-mapper 108 and the hotword-to-action database 110 are able to identify a subset of actions associated with the hotword "OK Google." That is, the hotword-to-action-mapper 108 receives data such that the hotword-to-action database 110 maps associations between hotwords, e.g., "OK Google," and actions, e.g., establishing network connection actions and/or waking the mobile computing device 100.

FIG. 2 illustrates a swim-lane diagram of interactions between an audio subsystem 295, a partial hotword action initiator 296, a hotword detector 297, a hotword-to-action mapper 298, and an action engine 299. In some examples, the audio subsystem 295 can include the audio subsystem 102 of FIG. 1; the partial hotword action initiator 296 can include the partial hotword initiator 104 of FIG. 1; the hotword detector 297 can include the hotword detector 106, the partial hotword detector 118, or both, of FIG. 1; the hotword-to-action mapper 298 can include the hotword-to-action mapper 108 of FIG. 1; and the action engine 299 can include the action engine 112 of FIG. 1. Specifically, in the illustrated example, a user, e.g., the user 116, provides the utterance "OK computer I mean OK Google call Mom" to a mobile computing device, e.g., the mobile computing device 100.

Figure 2A:
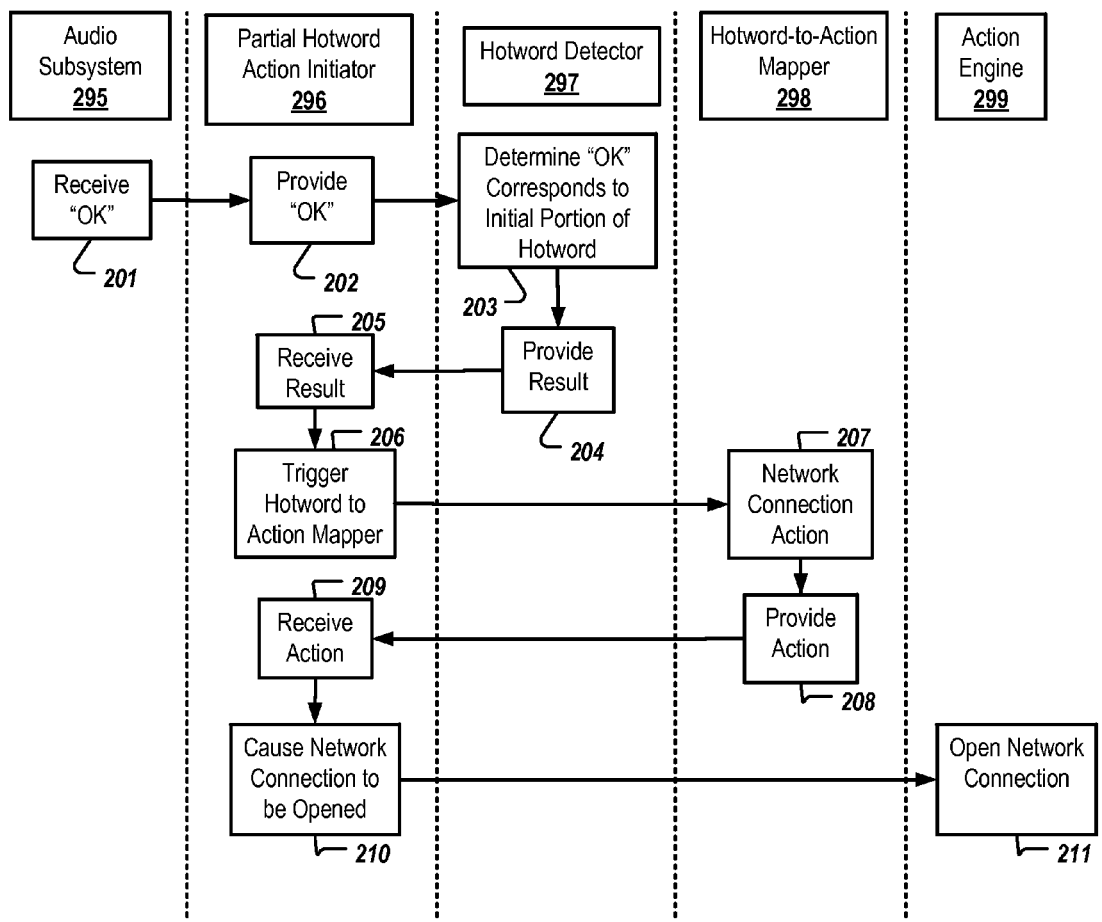
FIGS. 2A-2F depict swim-lane diagrams of example processes for detecting partial hotwords.
Figure 2A:

As illustrated in FIG. 2A, at step 201, the audio subsystem 295 receives and appropriately processes the partial utterance "OK." At step 202, the partial hotword action initiator 296 receives the processed partial utterance "OK" and forwards the same to the hotword detector 297. At step 203, the hotword detector 297 determines that the partial utterance "OK" corresponds to, at least, an initial portion of the hotword "OK Google." In some examples, the partial utterance "OK" can correspond to an initial portion of two or more hotwords. At step 204, the hotword detector 297 provides the determination, or result, to the partial hotword action initiator 296. For example, the partial hotword detector 296 determines that the partial utterance "OK" correspond to an initial portion of a hotword "OK Google." At step 205, the partial hotword action initiator 296 receives the determination, or result, and at step 206, in response, triggers the hotword-to-action mapper 298. For example, in response to the partial utterance "OK" corresponding to an initial portion of a hotword, the partial hotword action initiator 296 triggers the hotword-to-action-mapper 298 by providing the partial hotword "OK," or a signal associated with the partial hotword "OK," to the hotword-to-action initiator 298.

At step 207, the hotword-to-action mapper 298 maps the partial hotword "OK" of the entire hotword "OK Google" to an action, e.g., utilizing a database. For example, the hotword-to-action mapper 298 maps the partial hotword "OK" of the hotword "OK Google" to a network connection action, e.g., initializing or opening a network connection. At step 208, the hotword-to-action mapper 298 provides information associated with the network connection action to the partial hotword action initiator 296. At step 209, the partial hotword action initiator 296 receives the information associated with the network connection action. At step 210, the partial hotword action initiator 296 causes the network connection action to be performed. That is, the partial hotword action initiator 296 provides the information associated with the network connection action to the action engine 299. At step 211, the action engine 299 appropriately processes the network connection action information, including transmitting an interrupt signal to an operating system executing on a mobile computing device to perform the network connection action.

Figure 2B:
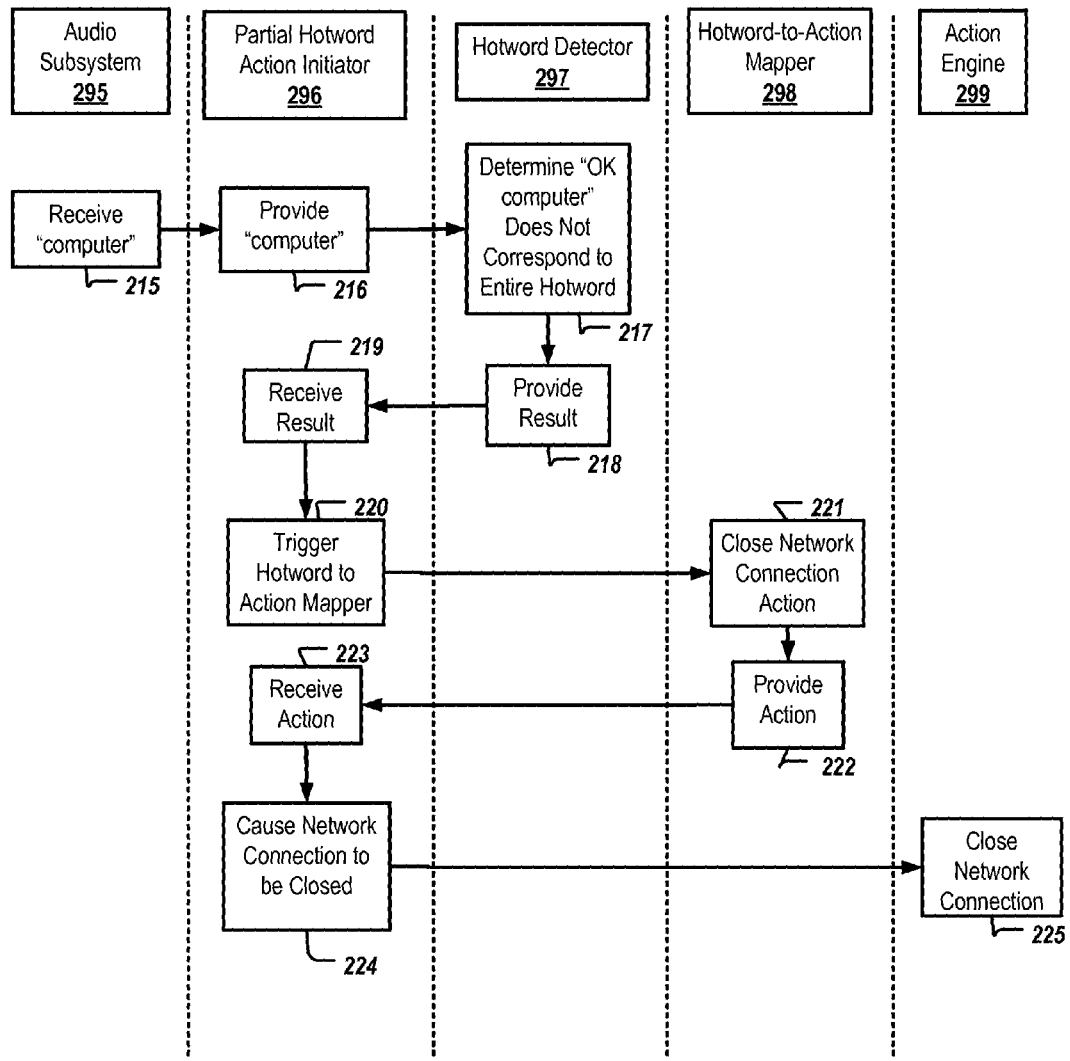

As illustrated in FIG. 2B, at step 215, the audio subsystem 295 receives and appropriately processes the partial utterance "computer." At step 216, the partial hotword action initiator 296 receives the processed partial utterance "computer" and forwards the same to the partial hotword detector 118. At step 217, the hotword detector 297 determines that the entire utterance "OK computer" does not correspond to, at least, the entire hotword "OK Google," or any other hotword. Specifically, in the illustrated example, the hotword detector 297 determines that the initial portion and the subsequent portion of the utterance "OK computer" does not correspond to an entire hotword.

In some examples, the processed audio data includes associated acoustic features, e.g., as identified by the audio subsystem 102. The hotword detector 297 can compare the acoustic features of the audio data associated with the entire utterance "OK computer" to acoustic features associated with one or more hotwords stored in a database. Based on the comparing of acoustic features, the audio data associated with the entire utterance "OK computer" is determined not to correspond to a hotword stored in the database.

In some examples, the processed audio data includes a transcription, e.g., as obtained by the audio subsystem 295. The hotword detector 297 can compare the transcription of the audio data associated with the entire utterance "OK computer" to transcriptions associated with hotwords stored in a database. Based on the comparing of transcriptions, the audio data associated with the entire utterance "OK computer" is determined not to correspond to a hotword stored in a database.

At step 218, the hotword detector 297 provides the determination, or result, to the partial hotword action initiator 296. For example, the hotword detector 297 determines that the entire utterance "OK computer" does not correspond to a hotword. At step 219, the partial hotword action initiator 296 receives the determination, or result, and at step 220, in response, triggers the hotword-to-action mapper 298. For example, in response to the utterance "OK computer" not corresponding to a hotword, the partial hotword action initiator 297 triggers the hotword-to-action-mapper 298. At step 221, the hotword-to-action mapper 298 selects an additional subset of actions that when performed, cause the open network connection action to be reversed, or cancelled. For example, each particular action corresponding to a hotword can further be associated with one or more additional actions that when selected, reverse the particular action that was previously performed. For example, the open network connection action, as performed at step 211, can be associated with a close network connection action such that when the hotword "OK Google" is not detected, e.g., after detecting the partial hotword "OK," the open network connection action is reversed. In some examples, each particular action can be associated with two or more additional actions that reverse the particular action, e.g., negate the particular action.

At step 222, the hotword-to-action mapper 298 provides information associated with the close network connection action to the partial hotword action initiator 296. At step 223, the partial hotword action initiator 296 receives the information associated with the close network connection action. At step 224, the partial hotword action initiator 296 causes the close network connection action to be performed. That is, the partial hotword action initiator 296 provides the information associated with the close network connection action to the action engine 299. At step 225, the action engine 299 appropriately processes the close network connection action information, including transmitting an interrupt signal to an operating system executing on a mobile computing device to perform the close network connection action.

Figure 2C:
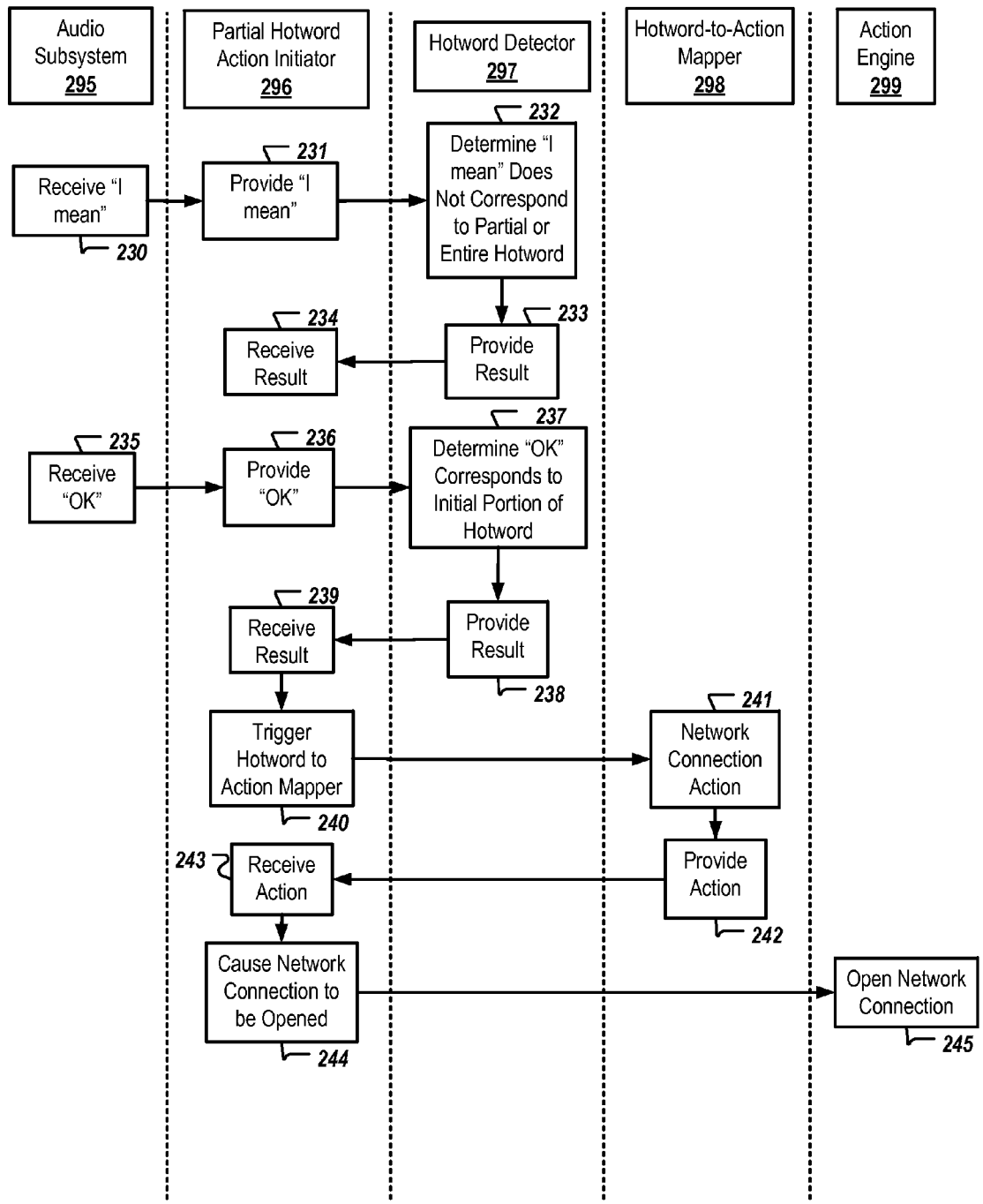

As illustrated at FIG. 2C, at step 230, the audio subsystem 295 receives and appropriately processes the utterance "I mean." At step 231, the partial hotword action initiator 296 receives the processed utterance "I mean" and forwards the same to the hotword detector 297. At step 232, the hotword detector 297 determines that the utterance "I mean" does not corresponds to, at least, an initial portion of a hotword or an entire hotword. At step 233, the hotword detector 297 provides the determination, or result, to the partial hotword action initiator 296. At step 234, the partial hotword action initiator 296 receives the determination, or result, and, in response to the utterance "I mean" not corresponding to an initial portion of a hotword or an entire hotword, takes no further action.

At step 235, the audio subsystem 295 receives and appropriately processes the partial utterance "OK." At step 236, the partial hotword action initiator 295 receives the processed partial utterance "OK" and forwards the same to the hotword detector 297. At step 237, the hotword detector 297 determines that the partial utterance "OK" corresponds to, at least, an initial portion of the hotword "OK Google." At step 238, the hotword detector 297 provides the determination, or result, to the partial hotword action initiator 296. For example, the hotword detector 297 determines that the partial utterance "OK" correspond to an initial portion of a hotword "OK Google." At step 239, the partial hotword action initiator 296 receives the determination, or result, and at step 240, in response, triggers the hotword-to-action mapper 298. For example, in response to the partial utterance "OK" corresponding to an initial portion of a hotword, the partial hotword action initiator 296 triggers the hotword-to-action-mapper 298 by providing the partial hotword "OK," or a signal associated with the partial hotword "OK," to the hotword-to-action mapper 298.

At step 241, the hotword-to-action mapper 298 maps the partial hotword "OK" to an action, e.g., utilizing a database. For example, the hotword-to-action mapper 298 maps the partial hotword "OK" of the entire hotword "OK Google" to a network connection action, e.g., initializing or opening a network connection. At step 242, the hotword-to-action mapper 298 provides information associated with the network connection action to the partial hotword action initiator 296. At step 243, the partial hotword action initiator 296 receives information associated with the network connection action. At step 244, the partial hotword action initiator 296 causes the network connection action to be performed. That is, the partial hotword action initiator 296 provides the information associated with the network connection action to the action engine 299. At step 245, the action engine 299 appropriately processes the network connection action information, including transmitting an interrupt signal to an operating system executing on a mobile computing device to perform the network connection action.

Figure 2D:
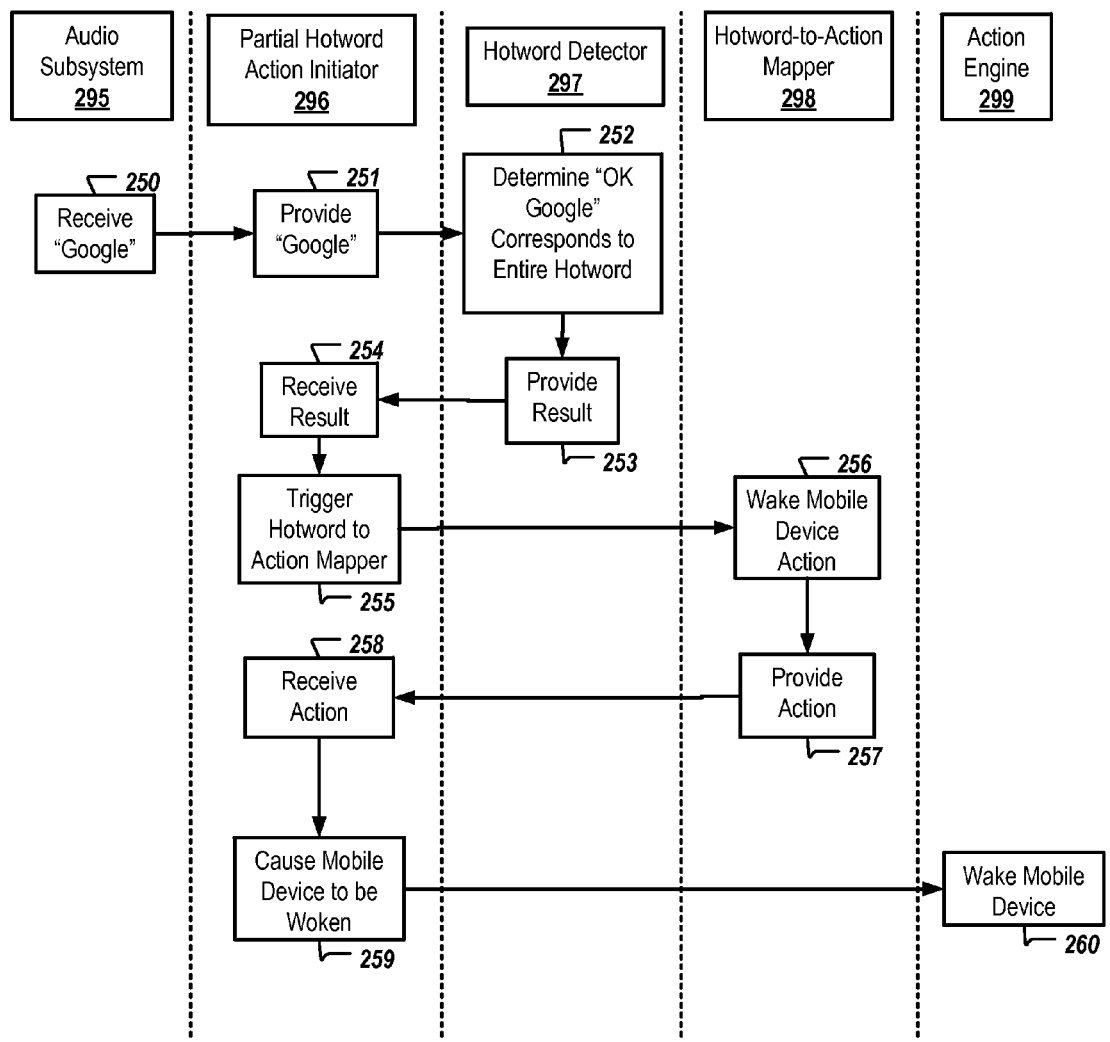

As illustrated at FIG. 2D, at step 250, the audio subsystem 295 receives and appropriately processes the partial utterance "Google." At step 251, the partial hotword action initiator 296 receives the processed partial utterance "Google" and forwards the same to the hotword detector 297. At step 252, the hotword detector 297 determines that the utterance "OK Google" corresponds to, at least, a hotword "OK Google." At step 253, the hotword detector 297 provides the determination, or result, to the partial hotword action initiator 296. For example, the partial hotword detector 297 determines that the initial utterance "OK" and the subsequent utterance "Google," collectively correspond to the hotword "OK Google." At step 254, the partial hotword action initiator 296 receives the determination, or result, and at step 255, in response, triggers the hotword-to-action mapper 298. For example, in response to the initial utterance "OK" and the subsequent utterance "Google," collectively, corresponding to an entire hotword, the partial hotword action initiator 296 triggers the hotword-to-action-mapper 298 by providing the entire hotword "OK Google," or a signal associated with the entire hotword "OK Google," to the hotword-to-action mapper 298.

At step 256, the hotword-to-action mapper 298 maps the hotword to an action, e.g., utilizing a database. For example, the hotword-to-action mapper 298 maps the hotword "OK Google" to a wake mobile device action, e.g., waking the mobile computing device from a sleep state, or "off state," to a wake state, or an "on" state. At step 257, the hotword-to-action mapper 298 provides information associated with the wake mobile device action to the partial hotword action initiator 296. At step 258, the partial hotword action initiator 296 receives information associated with the wake mobile device action. At step 259, the partial hotword action initiator 296 causes the wake mobile device action to be performed. That is, the partial hotword action initiator 296 provides the information associated with the wake mobile device action to the action engine 299. At step 260, the action engine 299 appropriately processes the wake mobile device action information, including transmitting an interrupt signal to an operating system executing on a mobile computing device to perform the wake mobile device action.

Figure 2E:
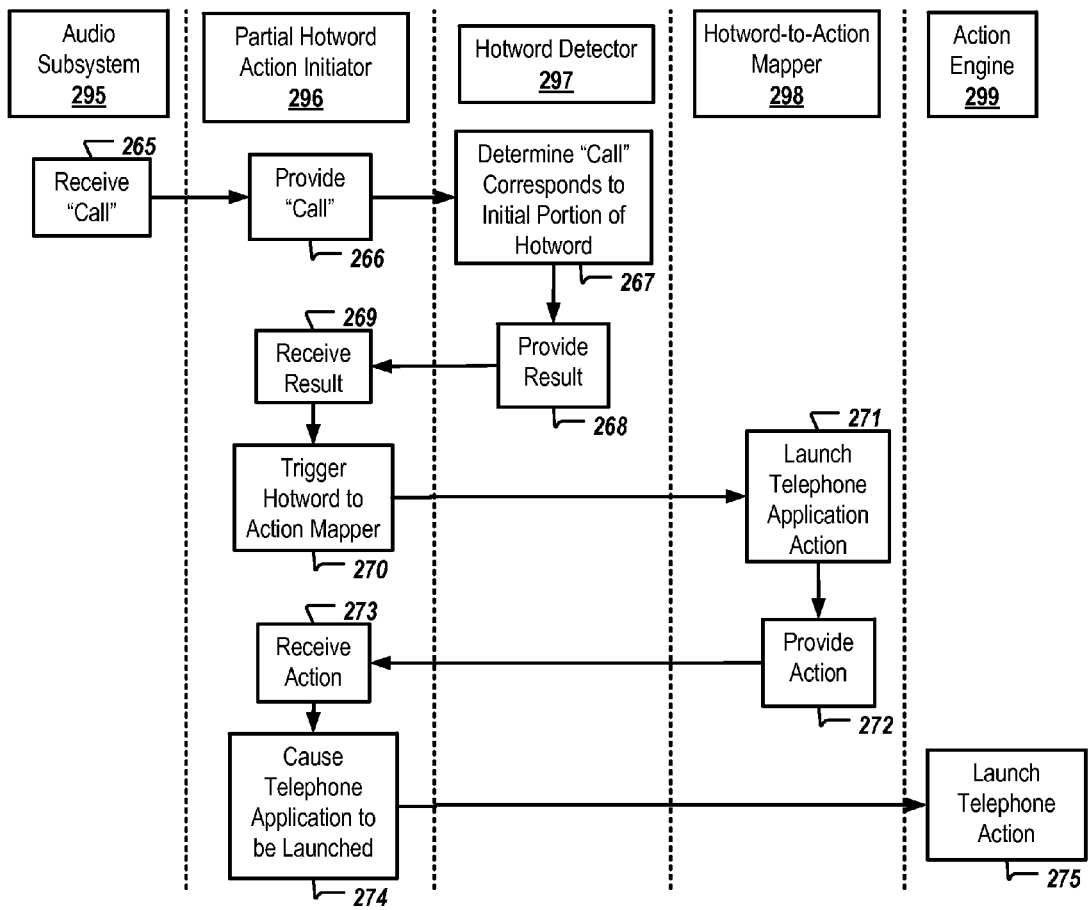

As illustrated at FIG. 2E, at step 265, the audio subsystem 295 receives and appropriately processes the partial utterance "Call." At step 266, the partial hotword action initiator 296 receives the processed partial utterance "Call" and forwards the same to the hotword detector 297. At step 267, the hotword detector 297 determines that the partial utterance "Call" corresponds to, at least, an initial portion of a hotword. At step 268, the hotword detector 297 provides the determination, or result, to the partial hotword action initiator 296. For example, the hotword detector 297 determines that the partial utterance "Call" correspond to an initial portion of a hotword. At step 269, the partial hotword action initiator 296 receives the determination, or result, and at step 270, in response, triggers the hotword-to-action mapper 298. For example, in response to the partial utterance "Call" corresponding to an initial portion of a hotword, the partial hotword action initiator 296 triggers the hotword-to-action-mapper 298 by providing the partial hotword "Call" to the hotword-to-action mapper 108.

At step 271, the hotword-to-action mapper 298 maps the partial hotword of the hotword to an action, e.g., utilizing a database. For example, the hotword-to-action mapper 298 maps the partial hotword "Call" to a launch telephone application action, e.g., preloading of an application on a mobile computing device. At step 272, the hotword-to-action mapper 298 provides information associated with the launch telephone application action to the partial hotword action initiator 296. At step 273, the partial hotword action initiator 296 receives information associated with the launch telephone application action. At step 274, the partial hotword action initiator 296 causes the launch telephone application action to be performed. That is, the partial hotword action initiator 296 provides the information associated with the launch telephone application action to the action engine 299. At step 275, the action engine 299 appropriately processes the launch telephone application action information, including transmitting an interrupt signal to an operating system executing on a mobile computing device to perform the launch telephone application action.

Figure 2F:
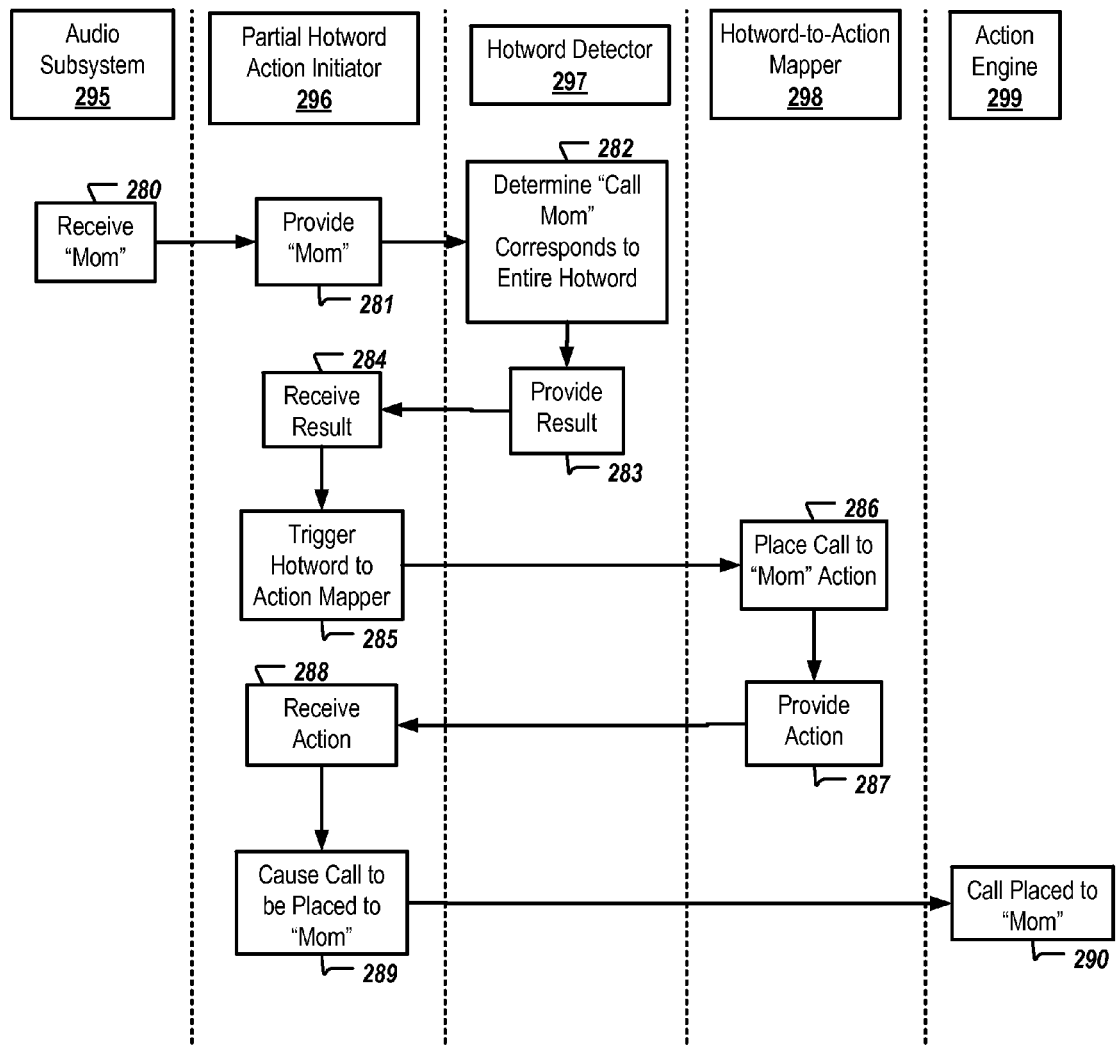

As illustrated at FIG. 2F, at step 280, the audio subsystem 295 receives and appropriately processes the partial utterance "Mom." At step 281, the partial hotword action initiator 296 receives the processed partial utterance "Mom" and forwards the same to the hotword detector 297. At step 282, the hotword detector 297 determines that the initial utterance "Call" and the subsequent utterance "Mom," collectively, correspond to, at least, the hotword "Call Mom." At step 283, the hotword detector 297 provides the determination, or result, to the partial hotword action initiator 296. For example, the hotword detector 297 determines that the initial utterance "Call" and the subsequent utterance "Mom," collectively, correspond to an entire hotword. At step 284, the partial hotword action initiator 296 receives the determination, or result, and at step 285, in response, triggers the hotword-to-action mapper 298. For example, in response to the initial utterance "Call" and the subsequent utterance "Mom," collectively, corresponding to an entire hotword, the partial hotword action initiator 296 triggers the hotword-to-action-mapper 298 by providing the entire hotword "Call Mom" to the hotword-to-action mapper 298.

At step 286, the hotword-to-action mapper 298 maps the entire hotword "Call Mom" to an action, e.g., utilizing a database. For example, the hotword-to-action mapper 298 maps the entire hotword "Call Mom" to a contact assigned with the utterance "Mom." The user may have previously associated the utterance "Mom" with a contact stored by a mobile computing device. At step 287, the hotword-to-action mapper 298 provides information associated with the place call to "Mom" action to the partial hotword action initiator 296. At step 288, the partial hotword action initiator 296 receives information associated with the place call to "Mom" action. For example, the information can include contact information associated with a contact "Mom." At step 289, the partial hotword action initiator 296 causes the call to be placed to "Mom" action to be performed. That is, the partial hotword action initiator 296 provides the information associated with the call to be placed to "Mom" action to the action engine 299. At step 290, the action engine 299 appropriately processes the call to be placed to "Mom" action information, including transmitting an interrupt signal to an operating system executing on a mobile computing device to perform the call to be placed to "Mom" action.

Figure 3:
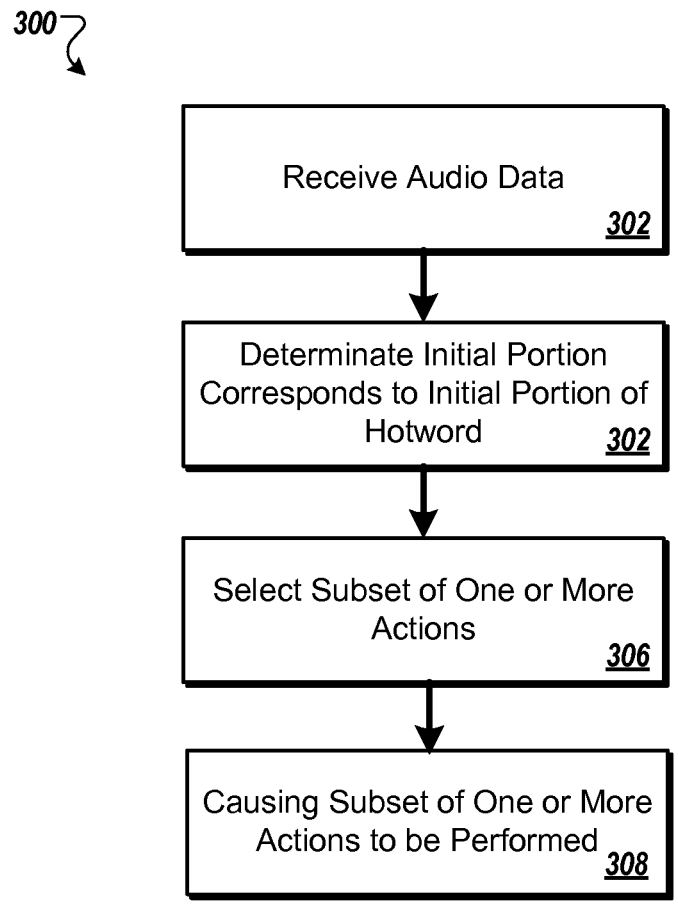
FIG. 3 depicts an example flowchart for detecting partial hotwords.

FIG. 3 depicts a flowchart of an example process 300 for identifying partial hotwords. The example process 300 can be executed using one or more computing devices. For example, the audio subsystem 102, the partial hotword action initiator 104, the hotword detector 106, the hotword to action mapper 108, the hotword-to-action database 110, the action engine 112, and the partial hotword detector 118 can be used to execute the example process 300.

Audio data is received (302). For example, the audio subsystem 102 receives the audio data of an utterance "OK Google" from the mobile computing device 114. An initial portion of the audio data is determined to correspond to an initial portion of a hotword (304). For example, the hotword detector 106, the partial hotword detector 118, or both, determine that the initial portion "OK" of the audio data "OK Google" corresponds to an initial portion of a hotword. In response to determining that the initial portion of the audio data corresponds to the initial portion of the hotword, a subset of one or more actions are selected from among a set of one or more actions that are performed when the entire hotword is detected (306). For example, the hotword-to-action mapper 108 identifies a particular set of actions that are associated with the entire hotword "OK Google." The hotword-to-action mapper 108 selects the subset of actions that are further associated with the partial hotword "OK" of the entire hotword "OK Google." One or more actions of the subset are caused to be performed (308). For example, the action engine 112 receives the subset of actions associated with the entire hotword "OK Google" that are caused to be performed.

Figure 4:
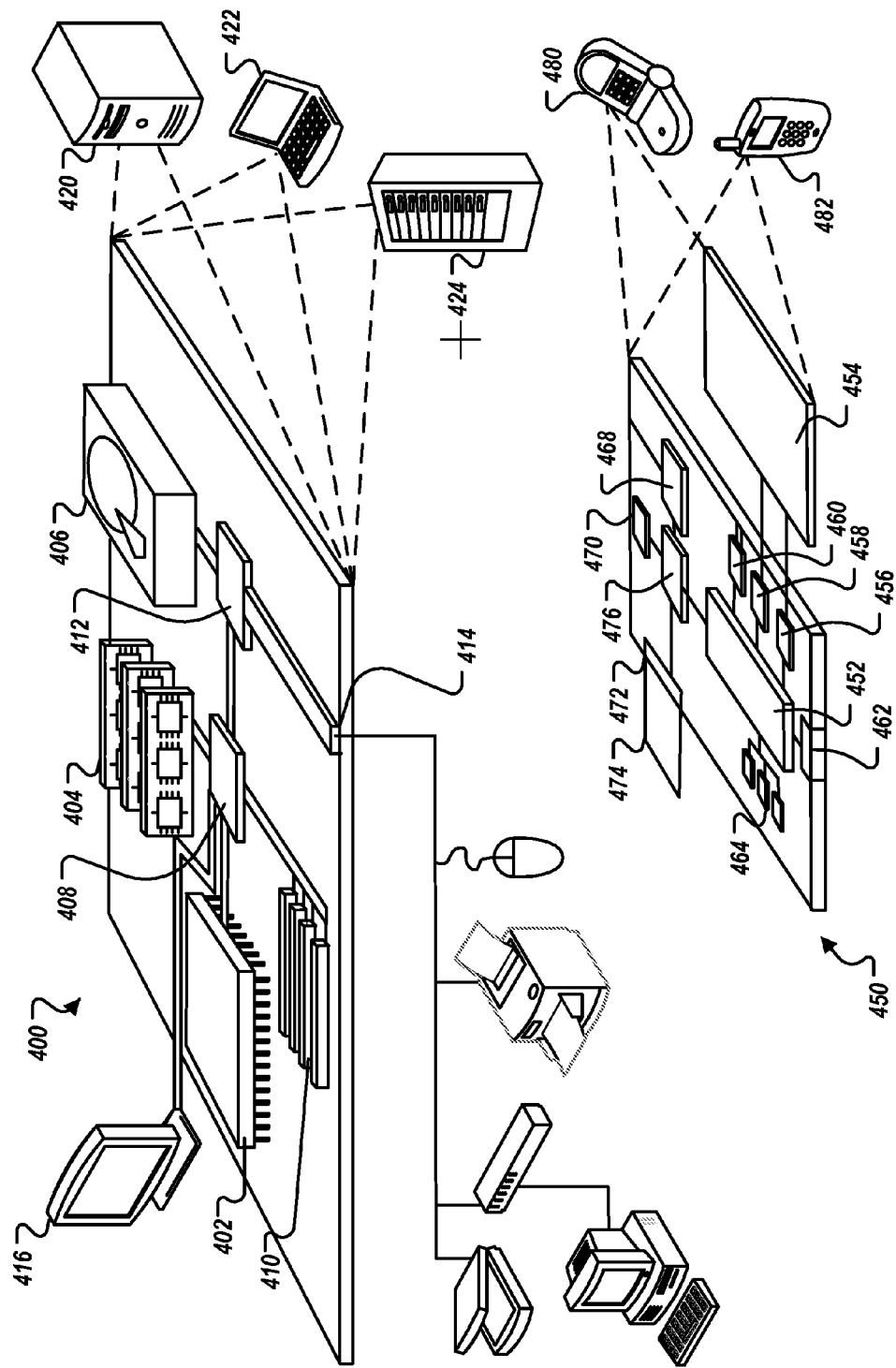
FIG. 4 depicts a computer device and a mobile computer device that may be used to implement the techniques described here.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, or a memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 may execute instructions within the computing device 640, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 648 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 may be implemented as one or more of a computer-readable medium or media, a volatile memory unit or units, or a non-volatile memory unit or units. Expansion memory 454 may also be provided and connected to device 450 through expansion interface 452, which may include, for example, a SIMM (Single In Line Memory Module) card interface. Such expansion memory 454 may provide extra storage space for device 450, or may also store applications or other information for device 450. Specifically, expansion memory 454 may include instructions to carry out or supplement the processes described above, and may include secure information also. Thus, for example, expansion memory 454 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/ or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 454, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 450 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method comprising:
   deriving audio data from a received utterance;
   determining that an initial portion of the audio data corresponds to a partial utterance of a hotword;
   in response to determining that the initial portion of the audio data corresponds to the partial utterance of the hotword, selecting a first set of one or more actions that are associated with the partial utterance of the hotword;
   causing the one or more actions of the first set to be performed;
   after determining that the initial portion of the audio data corresponds to the partial utterance of the hotword, determining that the audio data does not correspond to an utterance of the hotword;
   in response to determining that the audio data does not correspond to the utterance of the hotword, selecting an additional set of one or more actions that counteract the one or more actions of the first set; and
   causing the one or more actions of the additional set to be performed.

2. The computer-implemented method of claim 1, wherein determining that the audio data does not correspond to the utterance of the hotword comprises:
   identifying one or more acoustic features of the audio data;
   comparing the one or more acoustic features of the audio data to one or more acoustic features associated with one or more hotwords stored in a database; and
   based on the comparing, determining that the audio data does not correspond to any hotword of the one or more hotwords stored in the database.

3. The computer-implemented method of claim 1, wherein determining that the audio data does not correspond to the utterance of the hotword comprises:
   obtaining a transcription of the audio data;
   comparing the transcription of the audio data to one or more transcriptions associated with one or more hotwords stored in a database; and
   based on the comparing, determining that the audio data does not correspond to any hotword of the one or more hotwords stored in the database.

4. The computer-implemented method of claim 1, wherein determining that the audio data does not correspond to the utterance of the hotword comprises determining that the audio data does not correspond to a full utterance of the hotword.

5. The computer-implemented method of claim 1, wherein causing the one or more actions of the additional set to be performed comprises negating the actions of the first set of the one or more actions.

6. The computer-implemented method of claim 1, wherein a particular action of the first set of one or more actions includes initializing a network connection of a computing device, and a corresponding action of the additional set of one or more actions includes closing the network connection of the computing device.

7. The computer-implemented method of claim 1, wherein the one or more actions of the first set include an action whose respective result is not discernible to a user of a computing device performing the action.

8. A system comprising:
   one or more processors and one or more storage devices storing instructions that are operable, when executed by the one or more processors, to cause the one or more processors to perform operations comprising:
   deriving audio data from a received utterance;
   determining that an initial portion of the audio data corresponds to a partial utterance of a hotword;
   in response to determining that the initial portion of the audio data corresponds to the partial utterance of the hotword, selecting a first set of one or more actions that are associated with the partial utterance of the hotword;

causing the one or more actions of the first set to be performed;

after determining that the initial portion of the audio data corresponds to the partial utterance of the hotword, determining that the audio data does not correspond to an utterance of the hotword;

in response to determining that the audio data does not correspond to the utterance of the hotword, selecting an additional set of one or more actions that counteract the one or more actions of the first set; and causing the one or more actions of the additional set to be performed.

9. The system of claim 8, wherein determining that the audio data does not correspond to the utterance of the hotword comprises:

identifying one or more acoustic features of the audio data;

comparing the one or more acoustic features of the audio data to one or more acoustic features associated with one or more hotwords stored in a database; and based on the comparing, determining that the audio data does not correspond to any hotword of the one or more hotwords stored in the database.

10. The system of claim 8, wherein determining that the audio data does not correspond to the utterance of the hotword comprises:

obtaining a transcription of the audio data;

comparing the transcription of the audio data to one or more transcriptions associated with one or more hotwords stored in a database; and based on the comparing, determining that the audio data does not correspond to any hotword of the one or more hotwords stored in the database.

11. The system of claim 8, wherein determining that the audio data does not correspond to the utterance of the hotword comprises determining that the audio data does not correspond to a full utterance of the hotword.

12. The system of claim 8, wherein causing the one or more actions of the additional set to be performed comprises negating the actions of the first set of the one or more actions.

13. The system of claim 8, wherein a particular action of the first set of one or more actions includes initializing a network connection of a computing device, and a corresponding action of the additional set of one or more actions includes closing the network connection of the computing device.

14. The system of claim 8, wherein the one or more actions of the first set include an action whose respective result is not discernible to a user of a computing device performing the action.

15. A non-transitory computer-readable medium storing instructions executable by one or more computers which, upon such execution, cause the one or more computers to perform operations comprising:

deriving audio data from a received utterance;

determining that an initial portion of the audio data corresponds to a partial utterance of a hotword;

in response to determining that the initial portion of the audio data corresponds to the partial utterance of the hotword, selecting a first set of one or more actions that are associated with the partial utterance of the hotword;

causing the one or more actions of the first set to be performed;

after determining that the initial portion of the audio data corresponds to the partial utterance of the hotword, determining that the audio data does not correspond to an utterance of the hotword;

in response to determining that the audio data does not correspond to the utterance of the hotword, selecting an additional set of one or more actions that counteract the one or more actions of the first set; and causing the one or more actions of the additional set to be performed.

16. The computer-readable medium of claim 15, wherein determining that the audio data does not correspond to the utterance of the hotword comprises:

identifying one or more acoustic features of the audio data;

comparing the one or more acoustic features of the audio data to one or more acoustic features associated with one or more hotwords stored in a database; and based on the comparing, determining that the audio data does not correspond to any hotword of the one or more hotwords stored in the database.

17. The computer-readable medium of claim 15, wherein determining that the audio data does not correspond to the utterance of the hotword comprises:

obtaining a transcription of the audio data;

comparing the transcription of the audio data to one or more transcriptions associated with one or more hotwords stored in a database; and based on the comparing, determining that the audio data does not correspond to any hotword of the one or more hotwords stored in the database.

18. The computer-readable medium of claim 15, wherein determining that the audio data does not correspond to the utterance of the hotword comprises determining that the audio data does not correspond to a full utterance of the hotword.

19. The computer-readable medium of claim 15, wherein causing the one or more actions of the additional set to be performed comprises negating the actions of the first set of the one or more actions.

20. The computer-readable medium of claim 15, wherein a particular action of the first set of one or more actions includes initializing a network connection of a computing device, and a corresponding action of the additional set of one or more actions includes closing the network connection of the computing device.

* * * * *